United States Patent [19]
Le Blanc

[11] Patent Number: 5,977,968
[45] Date of Patent: *Nov. 2, 1999

[54] GRAPHICAL USER INTERFACE TO COMMUNICATE ATTITUDE OR EMOTION TO A COMPUTER PROGRAM

[75] Inventor: Andrew D. Le Blanc, Ottawa, Canada

[73] Assignee: Mindmeld Multimedia Inc., Gloucester, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/818,236

[22] Filed: Mar. 14, 1997

[51] Int. Cl.$^6$ .................................................. G06F 3/14

[52] U.S. Cl. .................... 345/339; 345/349; 345/355; 345/977; 463/31; 463/32; 463/36

[58] Field of Search ................................. 395/339, 140, 395/141, 977, 329; 345/349, 348, 326, 340, 355; 436/31, 32, 30, 36

[56] References Cited

U.S. PATENT DOCUMENTS

| | | | |
|---|---|---|---|
| 4,752,069 | 6/1988 | Okada | 463/23 |
| 5,149,104 | 9/1992 | Edlstein | 463/31 |
| 5,404,444 | 4/1995 | Billings | 345/349 |
| 5,452,414 | 9/1995 | Rosendahl et al. | 345/355 |
| 5,498,002 | 3/1996 | Gechter | 463/31 |
| 5,689,286 | 11/1997 | Wugofski | 345/348 |
| 5,732,232 | 3/1998 | Brush | 395/339 |
| 5,772,508 | 6/1998 | Sugita | 463/36 |
| 5,880,731 | 3/1999 | Liles et al. | 345/349 |

*Primary Examiner*—Raymond J. Bayerl
*Assistant Examiner*—Thomas T. Nguyen
*Attorney, Agent, or Firm*—Renner, Otto, Boisselle & Sklar, P.L.L.

[57] ABSTRACT

A graphical user interface for a computer program includes the representation of a face (an avatar) on a computer screen which allows a user to communicate the user's attitude to a situation represented by the computer program. The expression of the face changes according to the user's movement of a cursor over the face. In response to a situation appearing on the computer screen, the user sets the expression on the face to correspond with the user's attitude. The situation on the computer screen changes accordingly.

20 Claims, 4 Drawing Sheets

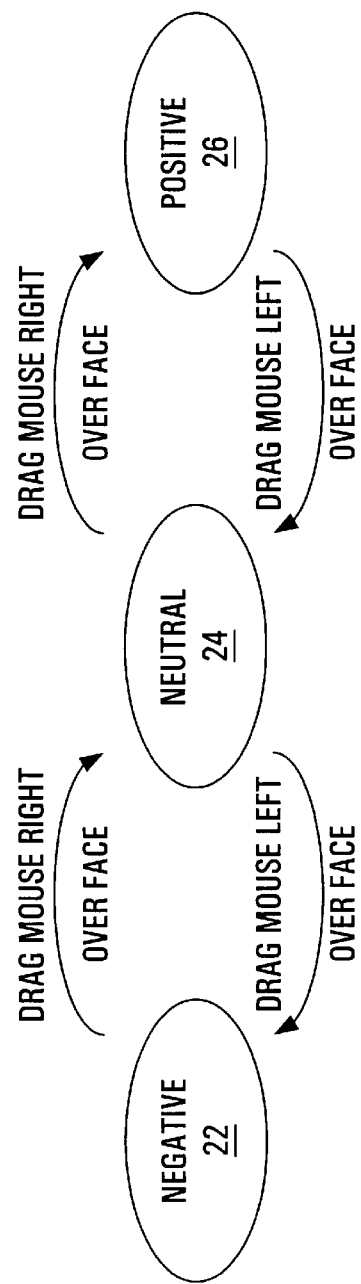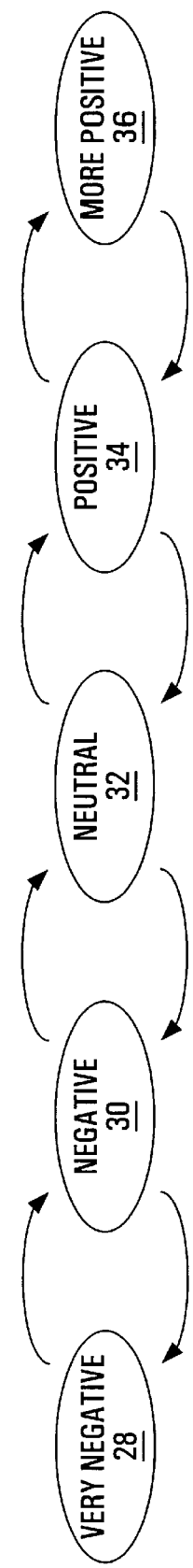
FIG. 2A
FIG. 2B

GRAPHICAL USER INTERFACE TO COMMUNICATE ATTITUDE OR EMOTION TO A COMPUTER PROGRAM

FIELD OF THE INVENTION

The invention relates to graphical user interfaces and is particularly concerned with graphical user interfaces in computer programs.

BACKGROUND OF THE INVENTION

Pictorial-based interfaces in computer programs are well-known. For example, U.S. Pat. No. 4,752,069 issued to Okada in 1988 allows a video game user to change the movement of a character on the video screen by shifting a lever in the desired direction. An arrow on the computer screen indicates the direction in which the lever ought to be shifted in order to effect successful movement of the character on the screen. Since the arrow simply tells the user how to behave in order to succeed in the game, the game does not require any independent thought on the part of the user.

U.S. Pat. No. 5,452,414 issued to Rosendahl in 1995 relates to a manipulable icon. Icons are typically two dimensional and display information about aspects of a computer program. The icon disclosed in this patent is notionally three dimensional and can be manipulated to show different information about an application such as the name of a document, its size, its creator, copyright information, etc. The icon described in this patent acts as a vehicle to transmit information about one or many documents to the user. The icon does not otherwise help the user interact with a particular computer application. In other words, while the icon provides information to the user, it does not help the user communicate information to a computer application.

U.S. Pat. No. 5,498,002 issued to Gechter in 1996 describes an interactive, electronic game having, among other aspects, "character behaviour controllers". The patent describes a game in which a user can choose a character and then control its behaviour according to the character's "character controller logic". For example, when a character is selected, a pop-up window may appear allowing the user to modify the character's actions or behaviour by selecting desired options from the pop-up menu. In other words, the user controls the character's behaviour directly by inputting specific commands. The characters simply behave as instructed by the user. The characters do not react to the user's behaviour or attitude to a particular situation.

There is at least one game available in which the characters behave according to or in response to a user's mood. In other words, the user does not tell the characters how to behave. Rather, in the game "Mode", produced by the company Animatics and available on the World Wide Web on the Internet, the user indicates his or her mood to a particular situation in the game, and the characters in the game react accordingly. The user indicates his or her mood by moving the cursor on the "Mood Bar" depicted on the computer screen and clicking the mouse. The Mood Bar is a rectangle showing a spectrum of colours, with red on the left hand side and green on the right hand side with appropriately varying colours in the middle. The user is meant to indicate his or her mood to a particular character or situation in the game by moving the cursor on the colour that best represents the user's mood (red for angry and green for happy, for example) and clicking the mouse. The characters in the game will then react appropriately in view of the user's mood.

While the Mood Bar does allow the game's characters to behave or react in response to the user's mood, the game does not consider other aspects of the user's personality or emotions. For example, a user could be in a good mood despite negative events that might occur in the game. Accordingly, it would be desirable to allow the characters in a computer game or program to react to aspects of the user's attitude to a situation in the game or program which could change from event to event, even though the user's mood may remain the same. Further, to reflect real-life situations, it may be more helpful or educational to the user to be able to see how his or her attitude may affect a given character's behaviour in a particular situation.

As indicated above, with the Mood Bar, the user points the cursor at a colour that represents his or her mood and clicks the mouse. However, the Mood Bar fails to provide any indication to the user as to the mood just selected or any indication that the program has even registered (or taken into consideration) the newly selected mood.

SUMMARY OF THE INVENTION

It is an object of the invention is to obviate or mitigate one or more of the above identified disadvantages.

According to a first broad aspect, the invention provides a computer program for use in a computer apparatus, the computer apparatus having a visual display device, an audio device and an input means, wherein the computer program when implemented on the computer apparatus displays on the display device a graphical user interface having a changeable appearance and wherein, in response to information conveyed by the computer program on at least one of the display device and the audio device, a user, using the input means, sets the appearance of the graphical user interface to correspond with an emotion of the user and wherein in response to the emotion of the user as represented on the graphical user interface, the computer program conveys further information on at least one of the display device and the audio device.

According to another broad aspect, the invention provides an interactive, electronic apparatus for a user to communicate the emotion of the user comprising a display screen; an audio device; a graphical user interface visible on the display screen and having a changeable appearance; an input device for the user to set the appearance of the graphical user interface to correspond with an emotion of the user; a computer program implemented on the interactive, electronic apparatus, for conveying information on at least one of the display screen and the audio device and wherein in response to the emotion of the user as represented in the appearance of the graphical user interface, the computer program conveys further information on at least one of the display screen and the audio device.

According to yet another broad aspect, the invention provides a method for a user to interact with a computer program run on a computer wherein the computer comprises a display means, an audio device and an input means and the computer program displays a graphical user interface having a changeable appearance on the display means, wherein the method comprises the steps of the computer program conveying information on at least one of the display means and the audio device; the user, using the input means, setting the appearance of the graphical user interface to correspond with an emotion of the user; and the computer program conveying further information on at least one of the display means and the audio device in response to the emotion of the user as represented on the graphical user interface.

Advantages of the present invention include allowing a user to interact with characters of a computer program by having the user express his or her attitude to particular characters or situations produced by the program and having the characters or situation in the program change accordingly. It is another advantage of the present invention to provide the user with immediate feedback showing a representation of the user's attitude.

BRIEF DESCRIPTION OF THE DRAWINGS

Preferred embodiments of the invention will now be described with reference to the attached drawings in which FIGS. 1a and b are representations of a computer screen having a graphical user interface depicting a positive and negative attitude, respectively, in accordance with an embodiment of the present invention;

FIGS. 2a and 2b are state diagrams of graphical user interfaces in accordance with an embodiment of the present invention when the graphical user interface has only three states and only five states, respectively.

FIG. 4 is a decision tree illustrating possible decisions at various times during progress of a computer program in accordance with an embodiment of the present invention where the graphical user interface has three states as shown in FIG. 2a.

DETAILED DESCRIPTION OF THE PREFERRED EMBODIMENT

The present invention relates to a graphical user interface for interactive computer software programs. A user manipulates the graphical user interface to reflect the user's attitude or other emotion. In view of a user's attitude or other emotion as represented by the graphical user interface, characters in the program react accordingly. Computer programs used in accordance with the preferred embodiment of the present invention are interactive and could be games, governmental or corporate employee training software or personnel assessment software, for example. of course, inasmuch as software can be incorporated in or as part of computer hardware, the invention could also be or form part of computer hardware. That said, the preferred embodiment of the present invention relates to software, as described below.

The computer has a microprocessor which controls the processes referred to below including the display on the computer screen.

Figure 1A:
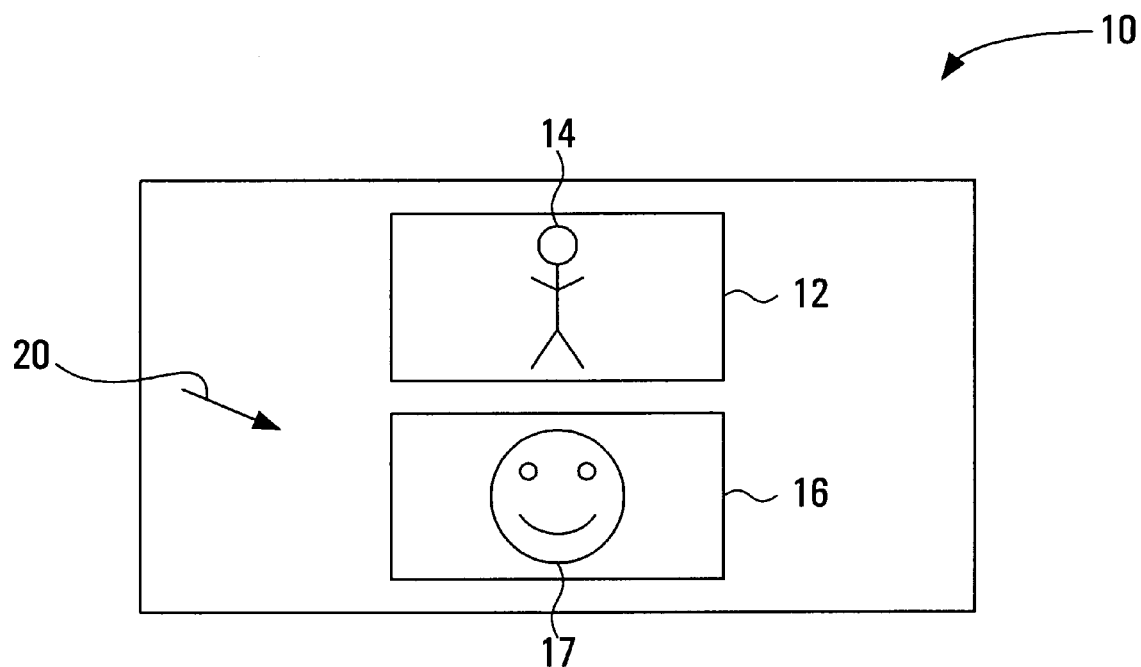
Figure 1B:
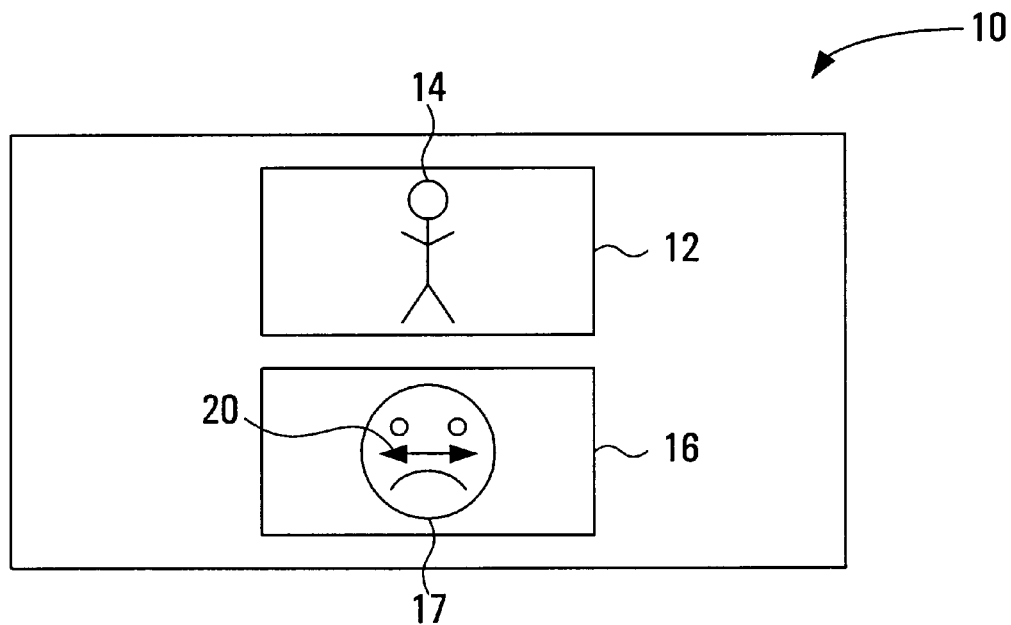

FIGS. 1a and 1b are representations of a computer display 10 having a graphical user interface ("GUI") 16 comprising an avatar 17. An avatar is a representation of the user of the computer program. In other words, the avatar is dynamic and represents certain changeable attributes of the user. The avatar 17 of FIG. 1a represents a user with a positive attitude, for example, while the avatar 17 of FIG. 1b represents a user with a negative attitude. The smiling face shown in the avatar of FIG. 1a is merely a depiction of a person with a positive attitude. Of course, it is possible for a person to have a negative attitude and smile at the same time and, accordingly, more accurate or different representations of the user's attitude are, of course, possible. For example, the avatar could be an entire body of a person instead of just the face and the user's attitude could be depicted by the body language of the avatar or by the expression on the face of the avatar in addition to body language of the avatar. For example, an avatar with slouched posture or crossed legs could, for example, depict a negative attitude, while upright posture and open legs may depict a positive attitude.

The GUI 16 occupies an area of the computer display 10. The representation of the GUI 16 on the computer display 16 could consist entirely of an avatar 17, for example, or as shown in FIGS. 1a or 1b, the GUI 16 could additionally occupy an area around avatar 17, which in FIGS. 1a and (b) are rectangles. The area of the GUI 16 around the avatar 17 could, however, be of any shape and size.

The computer display 10 also has an area 12 showing a computer program's character(s) 14 in various situations. The GUI 16 is manipulated by the user so as to reflect the user's attitude (or other emotion) to the character 14 or situation currently displayed in area 12. The avatar 17 of the GUI 16 in FIG. 1a reflects the user's positive attitude, whereas the avatar 17 of GUI 16 in FIG. 1b reflects the user's negative attitude.

According to the preferred embodiment of the present invention, the user indicates his or her attitude to a situation by first using a computer mouse (not shown) to move a cursor 20 over the GUI 16. When the cursor is outside the GUI 16, the cursor 20 appears in a default form, which, as shown in FIG. 1a, is in the form of a single-headed arrow, although, of course, any other shape for the default cursor can be used. When the user moves the cursor 20 over the GUI 16, the shape of the cursor changes its form, which in the embodiment shown in FIG. 1b, is a double-headed arrow, to indicate that the user can now input his or her attitude. When the cursor 20 is moved or placed over the GUI 16, the user can then input his or her attitude to the current situation or character by clicking a button of the mouse and holding the button down while moving the cursor 20 either right or left. If the cursor is moved right, the expression on the avatar 17 of the GUI 16 will change to become more positive. If the cursor is moved to the left, the expression on the avatar 17 of the GUI 16 will change to become more negative. When the user unclicks the mouse, the current expression of the avatar 17 of the GUI 16 reflects the user's attitude to the current situation in the computer program, and the character(s) 14 in area 12 will react accordingly.

Of course, instead of the user manipulating a mouse, movement of the cursor could also be effected by any of a number of possible input or pointing means such as by pressing appropriately programmed key sequences of a computer keyboard or by using a joystick, track ball or touch pad, for example. Alternatively, a cursor may not be necessary at all, where certain keystrokes or a joystick or verbal commands, for example, are programmed to control the GUI 16 directly.

The GUI 16 could be programmed to have or represent any number of different possible attitudes. FIG. 2a is a state diagram of an embodiment of the present invention where the GUI 16 has a total of three different attitudes, namely negative 22, neutral 24 and positive 26. For example, if the GUI 16 currently reflects a neutral attitude 24 and the user places the cursor 20 over the GUI 16 and clicks the mouse and moves the cursor 20 left, then the GUI 16 will become negative 22. In other words, the expression on the avatar in GUI 16 will change to reflect a negative attitude. If the cursor 20 is now moved to the right, the avatar in GUI 16 will change to reflect a neutral attitude 24. If the cursor is moved further to the right, the expression on the avatar will change to reflect a positive attitude 26. The GUI could be programmed to reflect any number of different possible attitudes. FIG. 2b for example, is a state diagram of an embodiment of the present invention where the GUI 16 has been programmed to have five possible different attitudes (ie: more negative, negative, neutral, positive, more positive).

Figure 3:
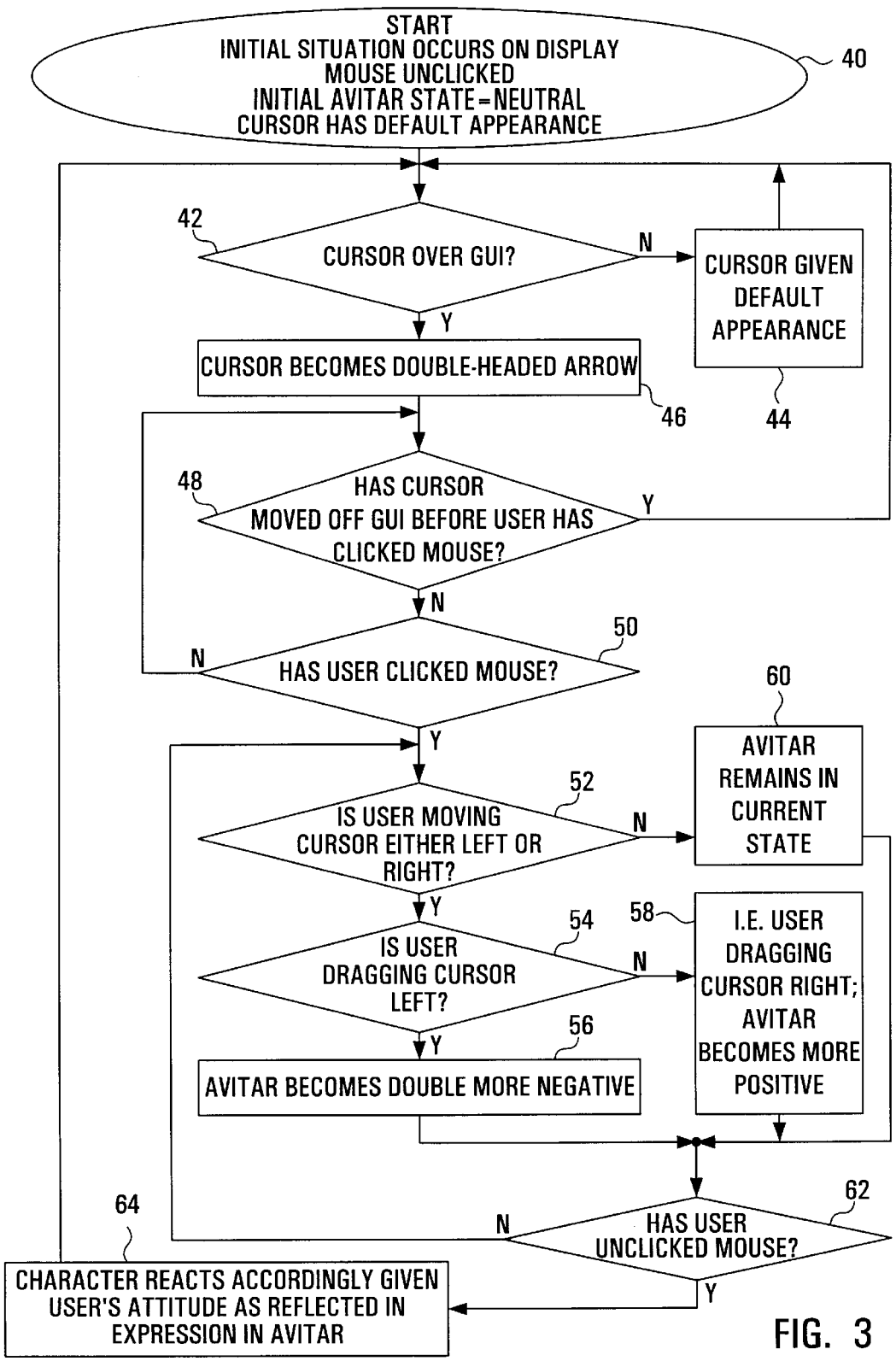
FIG. 3 is a flow chart depicting the process steps carried out by the preferred embodiment of the present invention.

Referring to FIG. 3, a flow chart is shown depicting the process steps carried out by the preferred embodiment of the present invention. When the computer program begins, it will likely present an initial situation or present a character 14 to the user on an output device, likely either visually on the display 10 or possibly aurally, through a speaker (not shown). As shown at "start" block 40, the GUI 16 will likely initially be set to reflect a neutral attitude and the cursor 20 will have a default appearance. The microprocessor will then consider whether or not the user has moved the cursor 20 over the GUI 16 as shown at block 42. If the cursor 20 is not over the GUI 16, then the cursor 20 will maintain its default appearance as shown at block 44 and the microprocessor will repeat the step shown at block 42. If the cursor 20 is moved over the GUI 16, then the cursor 20 becomes a double-headed arrow as shown at block 46. The microprocessor now considers whether or not the cursor 20 has moved off the GUI 16 before the user has clicked the mouse as shown at block 48. If the mouse has moved off the GUI 16 before the user has clicked the mouse, then the microprocessor returns to block 42 as shown at block 48. Otherwise, the processor considers if the user has clicked the mouse as shown at block 50. If the user has not clicked the mouse, then the microprocessor returns to block 48. Otherwise, the microprocessor considers the movement of the cursor 20 as shown at block 52. If the cursor 20 is moved left, then as shown at blocks 54 and 56, the expression of the avatar 17 of the GUI 16 becomes more negative. If the cursor 20 is moved right, then as shown at blocks 54 and 58, the expression of the avatar 17 of the GUI 16 becomes more positive. If the cursor 20 is moved neither to the left nor to the right, then as shown at blocks 52 and 60, the expression of the avatar 17 of the GUI 16 remains unchanged. Moving in the direction of the flow from any of blocks 56, 58 or 60, the microprocessor now considers if the user has unclicked the mouse, as shown at block 62. If the mouse remains clicked, then the microprocessor returns to block 52 (to determine if the expression of the avatar 17 of the GUI 16 should be further modified pending right or left movement of the cursor 20 by the user prior to unclicking the mouse). Otherwise, the user has unclicked the mouse, and as shown at block 64, the character in the program reacts in view of the user's attitude as reflected in the expression of the avatar 17 of GUI 16. At this point, the user must input his or her attitude to the most recent reaction of the character. Accordingly, the processor returns to block 42.

Figure 4:
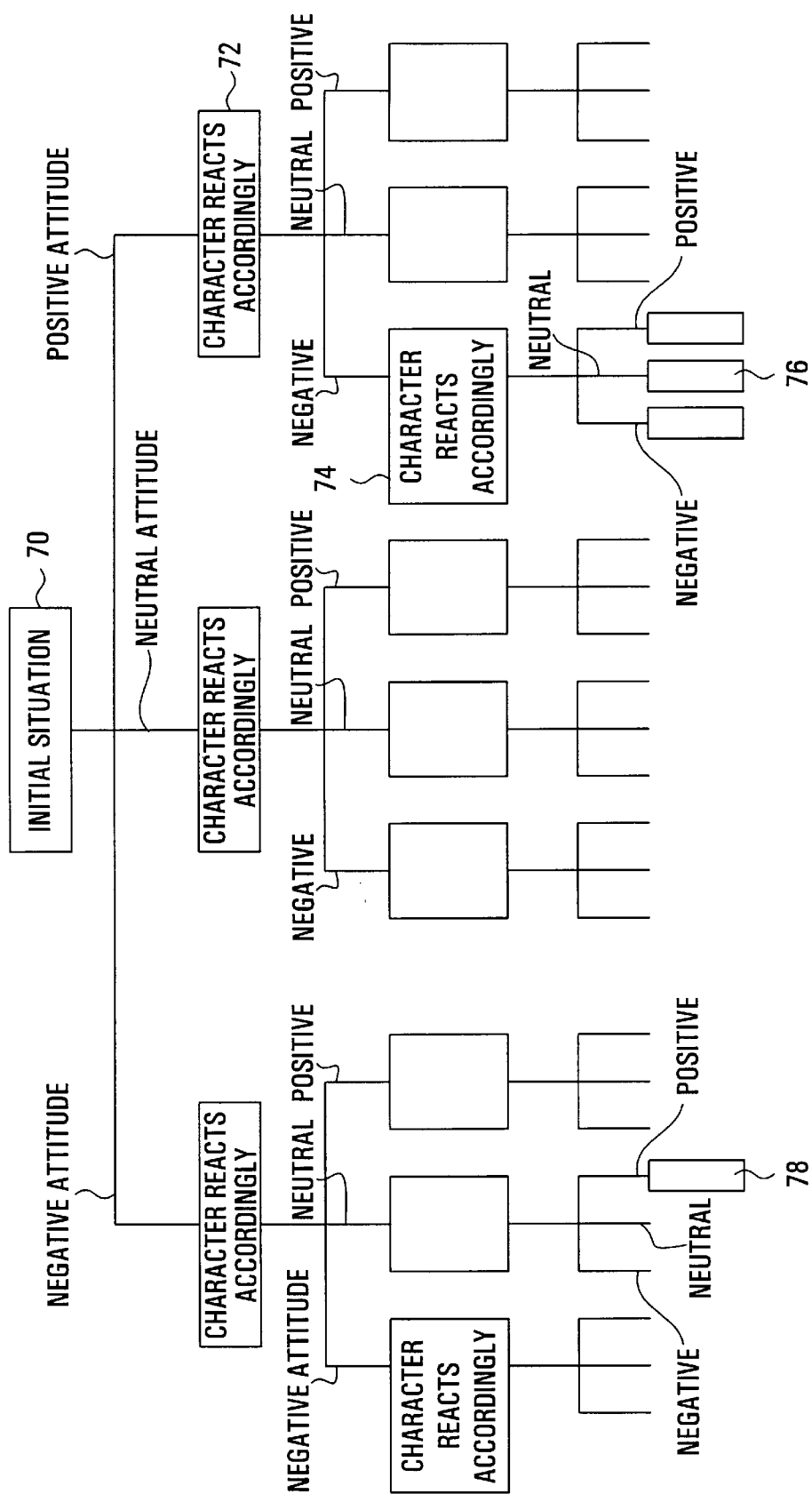

As suggested at block 64, the current character in the program may react differently in view of a user's positive attitude as opposed to a user's negative attitude. An example of a possible implementation of an embodiment of the present invention is shown in FIG. 4, which is a decision tree illustrating possible decisions at various times during progress of a computer program in accordance with an embodiment of the present invention. The decision tree of FIG. 4 relates to a GUI 16 having three possible states as shown in FIG. 2a. of course, if the GUI 16 were programmed for more than three possible states, then each node (where a decision is being made) of the decision tree would have a corresponding number of options. For example, if the GUI 16 were programmed to have 11 different states, then each node of the decision tree would have 11 options instead of the three options at each node shown in the decision tree of FIG. 4.

Referring to the decision tree of FIG. 4, block 70 of the decision tree corresponds to block 40 of the flow diagram of FIG. 3. At this point, the microprocessor presents the initial situation or scenario on the display 10. Then, in this example, the user can indicate one of three attitudes to the initial situation, namely negative, neutral or positive. If the user has a positive attitude to the initial situation and adjusts the GUI 16 to reflect his or her positive attitude, then the microprocessor will cause the situation or character 14 to react accordingly, as shown at block 72. If, in response to the character's reaction, the user now has a negative attitude and adjusts the GUI 16 to reflect his or her negative attitude, then the microprocessor will cause the situation or character 14 to react accordingly, as shown at block 74. If, in response to the character's reaction, the user now has a neutral attitude and adjusts the GUI 16 to reflect his or her neutral attitude, then the microprocessor will cause the situation or character 14 to react accordingly, as shown at block 76.

It is possible that the microprocessor can be programmed to react uniquely for each different block depicted in the decision tree of FIG. 4. In that case, at any particular step or block in the decision tree of FIG. 4, if the user has a positive attitude (for example) instead of a negative attitude (for example), then all the remaining situations in the program will be different (from what they would have been if the user had a negative attitude at that point in the program). On the other hand, the microprocessor can be programmed so that it is possible to arrive at the same situation from a different sequence of prior attitudes. For example, the microprocessor could be programmed so that the same situation results from blocks 76 and 78 even though they each represent a different sequence of attitudes to previous situations.

A partial program listing is attached as an Appendix. The program listing shows one possible implementation of an embodiment of the present invention using the programming language "Lingo".

Numerous modifications and variations of the present invention are possible in light of the above teachings. It is therefore to be understood that within the scope of the appended claims, the invention may be practised otherwise than as specifically described herein. For example, the microprocessor could be programmed to considers other emotions of the user alone or in addition to the user's attitude. In the embodiment described above, left and right movement of the cursor 20 over the avatar 17 reflects a positive and a negative change in the user's attitude, respectively. Other options could be programmed. For example, movement of the cursor 20 towards the top of the computer display 10 could reflect the user becoming happier while movement of the cursor 20 towards the bottom of the computer display 10 could reflect the user becoming increasingly sad.

Another possible modification to the embodiment described above is to allow the user to select one of a number of different avatars. For example, possible avatars could include an attractive woman, an old man or a muscular soldier. Another possible avatar may be scanned images of the user him or herself, which could be incorporated as part of the computer program from scanned photographs of different expressions of the user. The characters in the computer program may be programmed to behave differently in a given situation to a particular avatar. For example, at a given point in the computer program, a character may react differently to an attractive woman with a negative attitude than to an old man with a negative attitude.

As another possible modification to the embodiments described above, between blocks 62 and 64 of FIG. 3, an additional element of the program could be incorporated involving verbal responses by the user. In this case, the program would incorporate voice response and recognition software programmed to recognize particular key words. For example, if a character said something causing the user to have a positive attitude, the user would adjust the GUI 16 accordingly and the user might say "yeah, right" (meaning, perhaps "yes, I agree"). If the microprocessor were programmed to understand the key words "yeah, right" in this situation, the character would then react accordingly. This situation is to be contrasted to a situation where the user having a negative attitude says "yeah, right" (which, in the context of a negative attitude would likely be sarcastic and suggest "I don't believe you"). Given the user's attitude, the program would construe the meaning of the expression "yeah, right" differently, and the next situation would proceed accordingly. If the program is modified to include this speech recognition element, the decision tree in FIG. 4 would, of course, have to be modified accordingly to incorporate different additional outputs from each node of the tree depending upon the user's attitude to any particular situation in addition to the user's verbal reaction.

What I claim as my invention is:

1. A computer program residing on a computer-readable medium for use in a computer apparatus having a visual display device, an audio device and an input means, wherein the computer program, when implemented on the computer apparatus, displays on the display device a graphical user interface having a changeable appearance, enables the appearance of the graphical user interface to be set by a user in response to information conveyed by the computer program on at least one of the display device and the audio device, by using the input means, to correspond with an emotion of the user, and in response to the emotion of the user as represented on the graphical user interface, determines the content of and conveys further information on at least one of the display device and the audio device, the content of the further information being completely controlled by the computer program in response to the emotion of the user as represented on the graphical user interface and in accordance with a decision tree contained within and implemented by the computer program.

2. The computer program of claim 1 wherein the program is configured to interact with the user such that the user may incrementally change the appearance of the graphical user interface prior to setting the appearance.

3. The computer program of claim 2 wherein the graphical user interface comprises an avatar.

4. The computer program of claim 3 wherein the emotion of the user as represented on the avatar is the attitude of the user.

5. The computer program of claim 4 wherein the avatar is a face.

6. The computer program of claim 5 wherein the input means comprises a pointing means.

7. The computer program of claim 6 wherein the pointing means comprises a computer mouse and a cursor displayed on the display device.

8. An interactive, electronic apparatus for a user to communicate the emotion of the user comprising:

a display screen;

an audio device;

a graphical user interface visible on the display screen and having a changeable appearance;

an input device for the user to set the appearance of the graphical user interface to correspond with an emotion of the user; and a computer program implemented on the interactive, electronic apparatus, for conveying information on at least one of the display screen and the audio device and wherein in response to the emotion of the user as represented in the appearance of the graphical user interface, the computer program, in response to the emotion of the user as represented on the graphical user interface, determines the content of and conveys further information on at least one of the display screen and the audio device, the content of the further information being completely controlled by the computer program in response to the emotion of the user as represented on the graphical user interface and in accordance with a decision tree contained within and implemented by the computer program.

9. The interactive, electronic apparatus of claim 8 wherein the computer program is configured to interact with the user such that the user may incrementally change the appearance of the graphical interface prior to setting the appearance of the graphical user interface.

10. The interactive, electronic apparatus of claim 9 where in the graphical user interface comprises an avatar.

11. The interactive, electronic apparatus of claim 10 wherein the emotion of the user as represented in the appearance of the avatar is the attitude of the user.

12. The interactive, electronic apparatus of claim 11 wherein the avatar is a face.

13. The interactive, electronic apparatus of claim 12 wherein the input means comprises a pointing means.

14. The interactive, electronic apparatus of claim 13 wherein the pointing means comprises a computer mouse and a cursor displayed on the display screen.

15. A method for a user to interact with a computer program run on a computer wherein the computer comprises a display means, an audio device and an input means and the computer program displays a graphical user interface having a changeable appearance on the display means, wherein the method comprises the steps of the computer program conveying information on at least one of the display means and the audio device;

the user, using the input means, setting the appearance of the graphical user interface to correspond to an emotion of the user; and the computer program, in response to the emotion of the user as represented on the graphical user interface, determining the content of and conveying further information on at least one of the display means and the audio device in response to the emotion of the user as represented on the graphical user interface, the content of the further information being completely controlled by the computer program in response to the emotion of the user as represented on the graphical user interface interface and in accordance with a decision tree contained within and implemented by the computer program.

16. The method of claim 15 wherein the user may use the input means to incrementally change the appearance of the graphical user interface prior to setting the appearance of the graphical user interface.

17. The method of claim 16 wherein the graphical user interface comprises an avatar.

18. The method of claim 17 wherein the emotion of the user as represented on the avatar is the attitude of the user.

19. The method of claim 18 wherein the avatar is a face.

20. The method of claim 19 wherein the input means comprises a pointing means.

* * * * *